(12) United States Patent
Shiraishi

(10) Patent No.: US 6,873,445 B2
(45) Date of Patent: Mar. 29, 2005

(54) OPTICAL MULTI-BEAM SCANNING DEVICE AND IMAGE FORMING APPARATUS

(75) Inventor: Takashi Shiraishi, Kawasaki (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 44 days.

(21) Appl. No.: 10/457,462

(22) Filed: Jun. 10, 2003

(65) Prior Publication Data

US 2004/0252357 A1 Dec. 16, 2004

(51) Int. Cl.[7] .............................................. G02B 26/08
(52) U.S. Cl. ...................................... 359/204; 347/233
(58) Field of Search ......................... 359/204, 216–219; 347/232–235, 243, 244

(56) References Cited

U.S. PATENT DOCUMENTS

| | | |
|---|---|---|
| 5,715,078 A | 2/1998 | Shiraishi et al. |
| 5,734,489 A | 3/1998 | Shiraishi et al. |
| 5,838,479 A | 11/1998 | Shiraishi et al. |
| 5,963,354 A | 10/1999 | Shiraishi et al. |
| 6,347,003 B1 | 2/2002 | Shiraishi et al. |

FOREIGN PATENT DOCUMENTS

JP          2001-330788 A        11/2001

Primary Examiner—Euncha P. Cherry
(74) Attorney, Agent, or Firm—Foley & Lardner LLP

(57) ABSTRACT

An optical multi-beam scanning device includes three or more light sources, a pre-deflection optical unit for providing a predetermined characteristic for each light beam emitted from the light sources, each pre-deflection optical unit being disposed so that a height of an optical path in a sub-scanning direction and an angle in the sub-scanning direction differ, a within-set combining unit for combining the optical paths by reflecting certain light beams being components of a set, and a light deflection unit for deflecting the plurality of light beams via the within-set combining unit in the main-scanning direction by reflection of a same surface.

13 Claims, 8 Drawing Sheets

OPTICAL MULTI-BEAM SCANNING DEVICE AND IMAGE FORMING APPARATUS

BACKGROUND OF THE INVENTION

The present invention relates to an image forming apparatus used for copying machines, printers, multi-function peripherals or the like having a copy function and a print function. Moreover, the present invention relates to an optical multi-beam scanning device used for such image forming apparatus. For example, the optical multi-beam scanning device and the image forming apparatus of the invention can be applied to the apparatus using color.

For example, in a conventional optical multi-beam scanning devices in which four scanning lines are formed, one polygon mirror is employed so that a portion of optical elements or all the optical elements in a post-deflection optical system are shared. In such scanning devices, when the four beams are scanned by one polygon mirror surface, for example, as disclosed in the U.S. Pat. No. 5,715,078 or the U.S. Pat. No. 5,838,479, each beam from each light source is adapted to be directed (namely, to be combined) to a same polygon mirror surface in order of arrangement in a sub-scanning direction. Between each light source from which each light beam is emitted and the polygon mirror surface, there is provided a pre-deflection optical system with respect to each beam, which performs predetermined functions such as adjustment of sectional shape of each beam, and each beam is directed to the same polygon mirror surface by means off optical elements and so on used for combination after it passes through the pre-deflection optical system.

However, each beam from each light source is combined to a common optical path in order of arrangement in the sub-scanning direction in a conventional method in which combining to four beams is performed. For that reason, it is required a longer distance in the sub-scanning direction between beams from each pre-deflection optical system. Otherwise, since a larger angle between respective beams is required, a sub-scanning direction incidence angle onto the polygon mirror surface must be made larger with respect to the beams of both ends in the sub-scanning direction.

In the former case, the width in the sub-scanning direction of the polygon mirror surface increases and this causes the increase in the polygon mirror size, whereby windage loss and wind noise are easily generated. In the latter case, sub-scanning direction displacement of an image surface caused by the polygon mirror surface irregularity (variation in distance from a center of rotation of-each surface) becomes greater to cause degradation of image quality. (it is proportional to an amount of mirror surface irregularity and proportional to the incidence angle in sub-scanning direction onto the polygon mirror surface.) Further, the longer distance between beams from each pre-deflection optical system or the larger sub-scanning direction incidence angle onto the polygon mirror surface of each beam makes sub-scanning direction thickness of the optical elements shared with the four beams in the post-deflection optical system greater.

That is to say, the above factors are the obstacles that hamper thinning and miniaturizing in the sub-scanning direction. In addition, the positions of optical elements for combining the plurality of beams must be disposed on such positions that are greatly distanced in the sub-scanning direction between beams. In other wards, greater distance from the polygon mirror is required to dispose the optical elements, and this is the obstacle for miniaturizing the optical multi-beam scanning device.

SUMMARY OF THE INVENTION

The object of the invention is to provide a small sized optical multi-beam scanning device with less sub-scanning direction beam displacement, which device deflects a plurality of light beams by means of a same reflecting surface.

An optical multi-beam scanning device of the invention includes three or more light sources, a pre-deflection optical unit for providing a predetermined characteristic for each of light beams emitted from the light-sources and being disposed so that a height of an optical path in a sub-scanning direction differs, each the pre-deflection optical unit corresponding to each of the light sources, within-set combining means, in order to adjust the optical paths in a main-scanning direction of at least two out of the three or more light beams, for separating the light beams from all of the light sources for which the predetermined characteristics are provided by the pre-deflection optical unit and whose heights of the optical paths in the sub-scanning direction are different into a plurality of sets having light beams components whose positions in the sub-scanning direction in the optical path are unadjacent, so that the optical paths of the light beams in the main-scanning direction is adjusted with respect to each set including two or more light beams, and a light deflection unit for defecting all of the light beams via the within-set combining means in the main-scanning direction by reflection of a same surface.

Another optical multi-beam scanning device of the invention includes three or more light sources, a pre-deflection optical unit for providing a predetermined characteristic for each of light beams emitted from the light sources, each of said pre-deflection optical unit corresponding to each of said light sources and being disposed so that a height of an optical path in a sub-scanning direction and an angle in the sub-scanning direction differ, within-set combining means for combining the optical paths by reflecting certain light beams being components of a set, said set being a group of light beams in which respective components are the light beams whose positions in the sub-scanning direction are unadjacent among the light beams which is from each of said pre-deflection optical units and whose heights of the optical paths and angles in said sub-scanning direction differ, and a light deflection unit for deflecting the plurality of light beams via said within-set combining means in the main-scanning direction by reflection of a same surface.

Another object of the invention is to provide the small sized image forming apparatus in which the optical multi-beam scanning device is applied.

Further, the other image forming apparatus of the invention is characterized in that any one of the above-described two types of the optical multi-beam scanning devices of the invention is applied.

BEST MODE OF THE INVENTION

Hereinafter, preferred embodiments of an optical multi-beam scanning device and an image forming apparatus of the invention is described with reference to the drawings.

A first Embodiment

Figure 1:
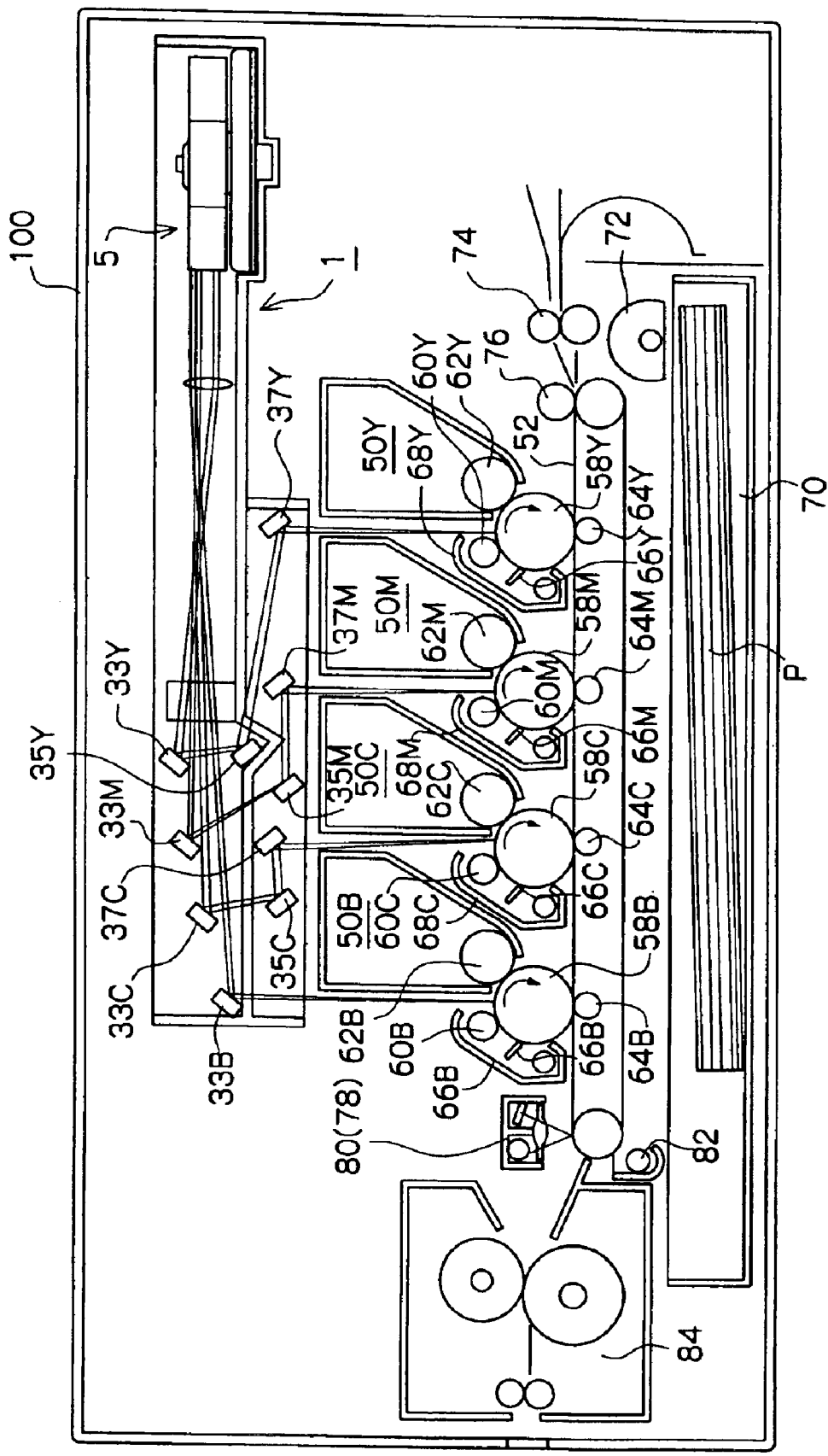
FIG. 1 is a schematic sectional view showing a color image forming apparatus according to a first embodiment of the invention.

FIG. 1 is a schematic sectional view showing a color image forming apparatus according to a first embodiment of the invention.

The following should be noted; in such color image forming apparatuses, typically, four types of image data obtained by color separation with respect to each color element such as yellow (Y), magenta (M), cyan (C) and black (B) and four sets of various components forming images with respect to each color element corresponding to each of Y, M, C and B are used. Therefore, in the following descriptions, the image data with respect to each color element and the components corresponding to each of the color elements are distinguished by using Y, M, C and B for each reference symbol. The same manner is applied for the figures subsequent to FIG. 1, as is the case with FIG. 1.

In FIG. 1, an image forming apparatus 100 includes a first, second, third and fourth image forming unit 50Y, 50M, 50C and 50B each of which forms an image with respect to each color element Y, M, C and B obtained by the color separation.

Each image forming unit 50 (Y, M, C and B) is disposed below an optical beam scanning device 1 in line in order of 50Y, 50M, 50C and 50B according to positions to which laser beams L (Y, M, C and B) corresponding to respective color element images are emitted via a third deflection mirrors 37Y, 37M, 37C and a first deflection mirror 33B (described later) in the optical multi-beam scanning device 1.

A transfer belt 52 for transferring images formed by respective image forming units 50 (Y, M, C and B) is provided below the respective image forming units 50 (Y, M, C and B).

The respective image forming units 50 (Y, M, C and B) include photosensitive drums 58 (Y, M, C and B), which are respectively in the shape of cylindrical drums and are provided so that they rotate in a direction indicated by an arrow, and on which electrostatic latent images corresponding to the images are formed.

Around the respective photosensitive drums 58(Y, M, C and B), charging devices 60 (Y, M, C and B), developing devices 62 (Y, M, C and B), transferring devices 64(Y, M, C and B), cleaners 66 (Y, M, C and B), and charge removing units 68 (Y, M, C and B) of well known in the art are disposed in order along the rotati n direction of respective photosensitive drums 58 (Y, M, C and B).

Note that one or two beams LY, LM, LC and LB that are guided by means of the respective mirrors 37Y, 37M, 37C and 33B of the optical beam scanning device and united to one or two beams in a sub-scanning direction on the photosensitive drums 58 are irradiated between the respective charging units 60 (Y, M, C and B) and the respective developing units 62 (Y, M, C and B), respectively.

A paper cassette 70 that accommodates sheets P (recording medium) is provided below the transferring belt 52.

On one end of the paper cassette 70, a sending roller 72 is provided which picks up the sheets P accommodated in the paper cassette 70 so that the sheets P are picked up one by one from the uppermost sheet. A resist roller 74 is provided between the sending roller 74 and the transferring belt 52.

On an upstream side of a transferring direction of sheets P when seen from the first image forming unit 50Y, an absorbing roller 76 for supplying the sheets P with predetermined electrostatic adsorption force.

On a downstream side of image forming unit 50 of the transferring belt 50, one pair of registration sensors 78 and 80 are disposed to detect the position of the image formed on the transfer belt 52 or on th sheet P transferred by means of transfer belt 52. (Only the sensor 80 disposed at the rear is shown because FIG. 1 is a front sectional view.)

On the transfer belt 52, a transfer belt cleaner 82 is provided which removes a toner adhered on the transfer belt 52 or dregs of the sheets P and so on.

On a downstream side of the transferring direction of sheets P when seen from the transfer belt 52, a fixation device 84 is provided which fixes a toner image transferred onto the sheet P on the sheet P.

Figure 2:
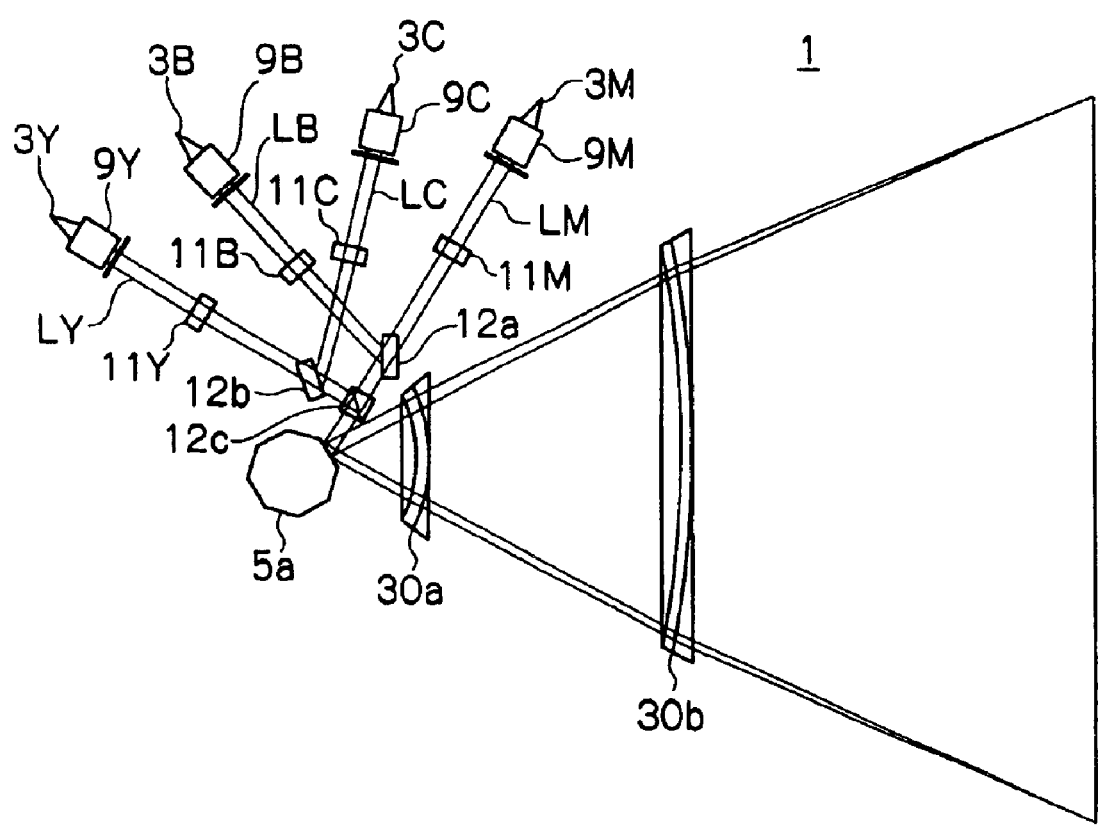
FIG. 2 is a schematic plane view showing an optical multi-beam scanning device of the first embodiment.

FIG. 2 is the schematic plan view showing the optical multi-beam scanning device 1 of the first embodiment used for the color image forming apparatus 100 as shown in FIG. 1. It should be noted that; with respect to a post-deflection optical system, deflection of the beam with the deflection mirror (Refer to FIG. 3.) is shown as unfolded form.

In FIG. 2, the optical multi-beam scanning device 1 includes only one light deflection unit 5 as a deflection means for deflecting the laser beams emitted from semiconductor lasers as a light source onto image surfaces disposed on predetermined positions, namely the predetermined positions of the respective photosensitive drums 58Y, 58M, 58C and 58B shown in FIG. 1, with a predetermined linear velocity. Hereinafter, the direction into which the laser beam is deflected with the light deflection unit 5 is referred to as a main-scanning direction.

The light deflection unit 5 includes a polygonal mirror body (polygon mirror) 5a having a plurality of (For example, eight surfac s) plane reflecting mirror (surface) in the shape of a regular polygon and a motor 5b which rotates the polygonal mirror body 5a in the main-scanning direction with a predetermined velocity. (Refer to FIG. 4.)

A post-deflection optical system 30 (an image formation optical system) including double lenses, namely, a first image formation lens 30a and a second image formation lens 30b (so called fθ lens) that provide a predetermined optical characteristic for the laser beam deflected in a predetermined direction by means of a reflecting surface of the light deflection unit 5 or the like are disposed between the light deflection unit 5 and the image surfaces.

Next, a pre-deflection optical system between the semiconductor lasers as the light source and the light deflection unit 5 is described.

The optical beam scanning device 1 includes the semiconductor lasers 3 (Y, M, C, and B) (light source) that generate laser beams corresponding to the image data obtained by the color separation with respect to each color element.

The pre-deflection optical system adjusting respective sectional beam spot shapes of the laser beams L (Y, M, C and B)from respective semiconductor lasers 3 (Y, M, C and B) to predetermined shapes is disposed between respective semiconductor lasers 3 (Y, M, C and B) and the light deflection unit 5.

A predetermined convergence is given to the divergent laser beams L (Y, M, C and B) emitted from the semiconductor lasers 3 (Y, M, C and B) of respective color elements by means of finite focal lenses 9, thereafter, each sectional beam shape is adjusted to a predetermined shape by a stop not shown in Figure. A predetermined convergence only in the sub-scanning direction is further given to the laser beams L (Y, M, C and B) passed through the stop via cylinder lenses 11 (Y, M, C and B), thereafter, the laser beams L are guided to the same surface of the polygon mirror 5a of the light deflection unit 5 via combining deflection mirrors 12a, 12b, a half mirror 12c and so on.

Instead of the half mirror 12c, a beam splitter may be used as well. When the beam splitter is used, orientations of the semiconductor lasers 3 (Y, M, C and B) may be selected so that polarizing direction of the emitted light conforms to transmission or reflection of the beam splitter. Otherwise a polarizing plate or the like may also be disposed on optical paths between the semiconductor lasers 3 (Y, M, C and B) and the beam splitter. The following manner may also be possible, in which a half amount of light is adapted to pass through a reflecting surface of the beam splitter while another half amount may be reflected of f the reflecting surface thereof.

Figure 3A:
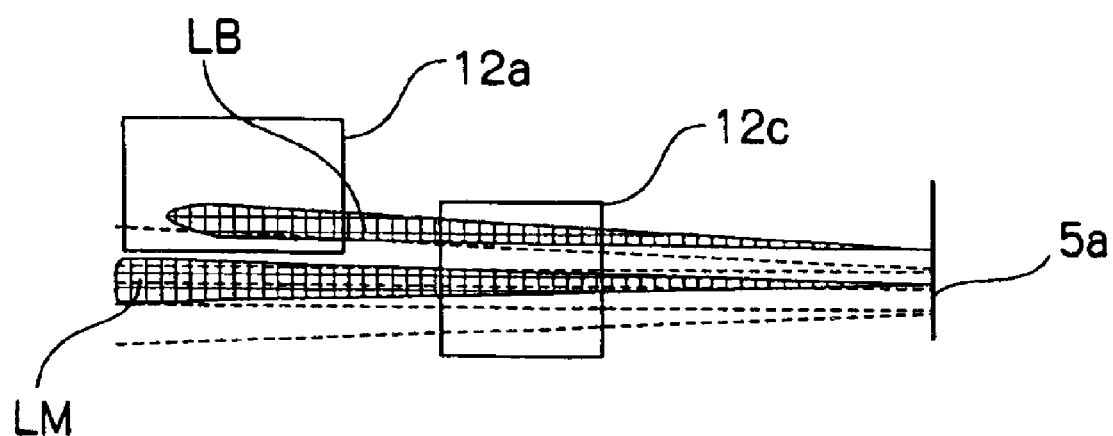
FIGS. 3A and 3B ar explanatory views showing positional relationships in a sub-scanning direction of laser beams used for combination in the optical multi-beam scanning device of the first embodiment.
Figure 3B:
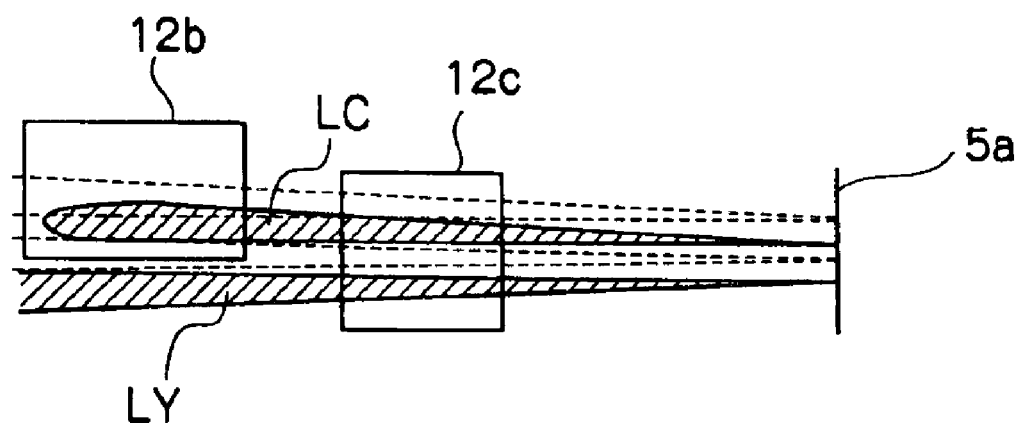

FIGS. 3A and 3B are explanatory views showing an optical path (A reflecting portion in the half mirror 12c is also shown with rectilinear propagation) of each laser beam L (Y, M, C and B) following to the combining deflection mirrors 12a and 12b and only positional relationship in the sub-scanning direction of each laser beam L (Y, M, C, and B) is precisely shown.

With respect to each laser beam L (Y, M, C, and B) irradiated onto the same surface of the polygon mirror 5a, a position in the sub-scanning direction becomes higher in order of LY, LM, LC, and LB.

As shown in FIG. 3B, the laser beam LY passed through a yellow cylinder lens 11Y further passes through a portion lower than the combining deflection mirror 12b, so that the laser beam LY is guided to the polygon mirror 5a by being reflected off the half mirror 12c. As shown in FIG. 3A, the laser beam LM passed through a magenta cylinder lens 11M further passes through a portion lower than the combining deflection mirror 12a, so that the laser beam LM is guided to the polygon mirror 5a by propagating rectilinearly through the half mirror 12c. The laser beam LC, as shown in FIG. 3B, passed through a cyan cylinder lens 11C is reflected off the combining deflection mirror 12b, thereafter the laser beam LC is further reflected off the half mirror 12c, so that the laser beam LC is guided to the polygon mirror 5a. As shown in FIG. 3A, the laser beam LB passed through a black cylinder lens 11B is reflected off the combining deflection mirror 12a, so that the laser beam LB is guided to the polygon mirror 5a by propagating rectilinearly through the half mirror 12C. In FIG. 3A, the laser beam LC and LY are represented by dotted lines respectively, while, in FIG. 3B, th laser beam LB and LM are represented by dotted lines respectively. In the position on which the deflection mirror 12a and 12b are disposed, there exists no beam interval for combining the laser beams that are adjacent with each other, i.e. the laser beam LB and LC or the laser beam LC and LM, in the sub-scanning direction on the polygon mirror. Therefore, it is understood that combining methods in prior arts are not possible.

The combining deflection mirror 12a is adapted to be combining means for uniting the optical paths of the laser beam LM and LB into one on the plan view shown in FIG. 2 (Note that positions in the sub-scanning direction are different.) and the combining deflection mirror 12b is adapted to be the combining means for uniting the optical paths of the laser beam LY and LC into one on the plane view shown in FIG. 2. (Note that positions in the sub-scanning direction differs and it is called combination of the optical path in the main-scanning direction.)

As for the position in the sub-scanning direction of the laser beams irradiated on the same surface of the polygon mirror 5a, the combining deflection mirror 12a, as well as the combining deflection mirror 12b, combines two laser beams that are at intervals of one laser beam.

Figure 4:
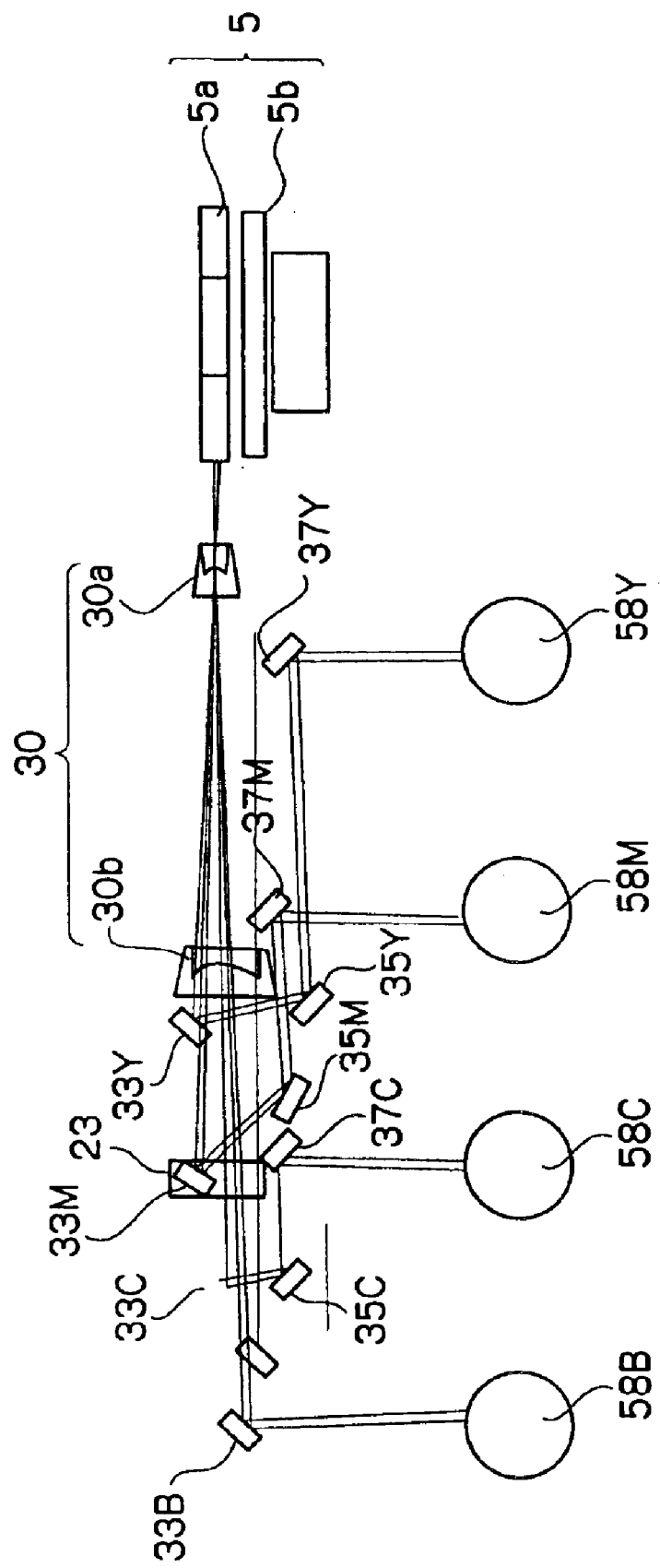
FIG. 4 is a schematic sectional view showing a post-deflection optical system of the optical multi-beam scanning device of the first embodiment.

In FIG. 4, it is shown that members between the light defl ction unit 5 and the resp ctive photosensitive drums 58 (Y, M, C and B) included in the optical beam scanning device 1 as a sub-scanning direction sectional view in which a deflection angle of the light deflection unit 5 is at a position of zero degree.

In FIG. 4, the first deflection mirrors 33 (Y, M, C, and B) that deflect the laser beams L (Y, M, C, and B) passed through the second image formation lens 30 b toward the image surface, second deflection mirrors 35Y, 35M and 35C, and third deflection mirrors 37Y, 37M and 37C that further deflect the laser beams LY, LM and LC deflected by means of the first deflection mirrors 33Y, 33M and 33C are disposed between the second imag formation lens 30b of the post-deflection optical system 30 and the image surface.

According to the above-mentioned first embodiment, four laser beams having different positions (or incidence angles) in the sub-scanning direction to be irradiated onto the same surface of the polygon mirror 5a are separated into two sets including two laser beams that are at intervals of one laser beam when seen from the sub-scanning direction. Next, with respect to each set, combination of the optical paths in the main-scanning direction is performed by means of the combining deflection mirrors 12a and 12b (a first combining means) on a position on which the beams are spatially distanced, the combining deflection mirrors being not a half mirror requiring strong dep nd nce on polarizing direction or delicat control of film thickness but a regular mirror. Thereafter, the four laser beams in total, or two laser beams in both sets, are further combined by means of the half mirror 12c or the beam splitter (a second combining means). This enables that the distance in the sub-scanning direction between two laser beams combined by the first combining means can be ensured. In addition, since a larger angle in the sub-scanning direction between beams is not required, displacement of a sub-scanning direction beam position on the image surface caused by above-mentioned irregularity can be reduced. Moreover, a distance between the laser beams that are adjacent in the sub-scanning direction can be made shorter. Furthermore, a distance from an irradiation point of the polygon mirror to a combining position (the combining position in the first or the second combining means) can be made longer.

Namely, the optical paths for the four laser beams can be combined without requiring longer distance and larger angle in the sub-scanning direction between the laser beams to be combined. In other word, a spatial restriction for the sub-scanning direction can be reduced. As a result, on the one hand, variation in beam positions in the sub-scanning direction is reduced while, on the other hand, the width of the polygon mirror surface in the sub-scanning direction can also be reduced, wh reby higher precision and further miniaturization or the like of the optical beam scanning device and the image forming apparatus can be ensured. An incidence angle in the sub-scanning direction to the polygon mirror surface is slightly inclined from a normal line direction in consideration of separation of each laser beam at the post-deflection optical system and when combination is intended using prior arts, the larger incidence angle is required for the combination because of the combination with the pre-deflection optical system, and as a result, sub-scanning direction position variation on the image surface influenced by the irregularity of the polygon mirror surface is deteriorated. According to the first embodiment, substantially no restriction for the beam arrangement by the pre-deflection optical system exists, and it is enough that a minimal sub-scanning direction beam angle, which is necessary for the separation of each laser beam in the pre-deflection optical system, can be ensured. Hence, the influence upon a beam position variation on the image surface by the surface irregularity can be reduced.

Figure 5:
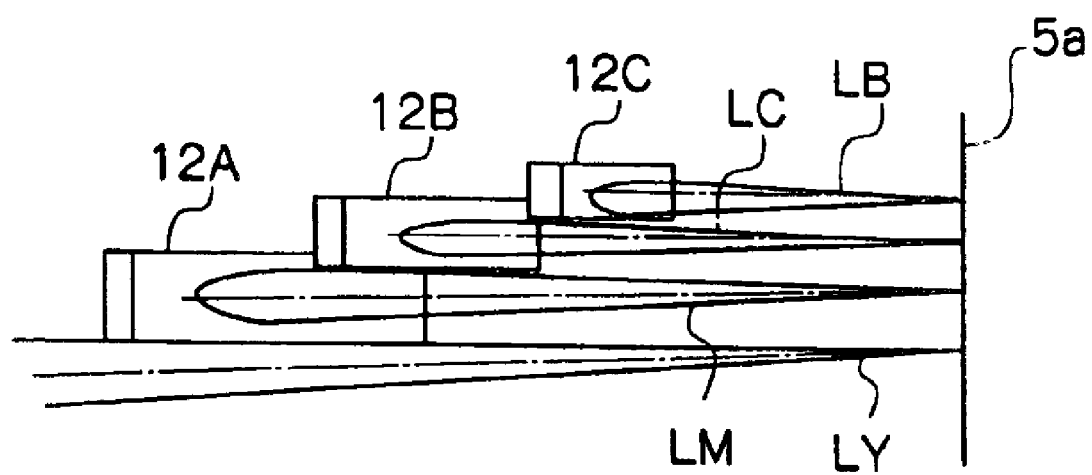
FIG. 5 is an explanatory view showing the positional relationships in the sub-scanning direction of the laser beams used for the combination of conventional one to compare it with the optical multi-beam scanning device of the first embodiment.

As shown in FIG. 5 (corresponding to FIG. 3), since the following method is conventionally employed; first, the laser beam LY whose position in the sub-scanning direction is the lowest is caused to propagate rectilinearly onto the polygon mirror 5a, next, the second lowest laser beam LM is reflected off a combining deflection mirror 12A to be united to the same optical path, then, the third lowest laser b am LC is reflected off a combining deflection mirror 12B to be united to the same optical path, and finally, the highest laser beam LB is reflected off a combining deflection mirror 12C to be united to the same optical path, larger interval of each laser beam in the sub-scanning direction is inevitable when considering the combining deflection mirrors 12A to 12C. In the first embodiment, as described above, the interval between respective laser beams in the sub-scanning direction can be reduced.

Since, on the one hand, the number of expensive half mirrors or beam splitters to be used can be reduced to one while, on the other hand, the inexpensive regular mirrors can be used for the rest of other mirrors, the cost reduction can be achieved.

In addition, when all of the syntheses are performed with the half mirror, an optical efficiency in a beam combination unit of the pre-deflection optical system is at most ¼ (25%) while the efficiency of 36%, namely the efficiency of 80% of the regular mirror ×the efficiency of 45% of the half mirror= 36%, can be easily ensured in the first embodiment. (Note that the above values are standard values.)

Alternatively, the optical efficiency over 72%, namely 80%×90%, in the beam combination unit of the pre-deflection optical system can be easily ensured in the following manner; instead of the half mirrors, the mirrors or the beam splitters having the reflecting surfaces whose transmittance and reflectance are different significantly depending on the polarizing direction are employed, then, a wave plate is inserted into one of the incident surfaces of the mirrors or the beam splitters so that the reflectance and the transmittance to the polarizing direction of each light beam in the light beams directed to each polygon mirror among the mirrors or the beam splitters are made to over 90%.

In the first embodiment, although the optical paths in the main-scanning direction conform completely to one another, combining (adjusting) under such condition may also be possible in which the optical paths in the main-scanning direction are shifted if it is within a range in which fθ characteristic does not vary greatly and significant degradation of curvature of field or curvature of scanning line does not arise.

A Second Embodiment

Figure 6:
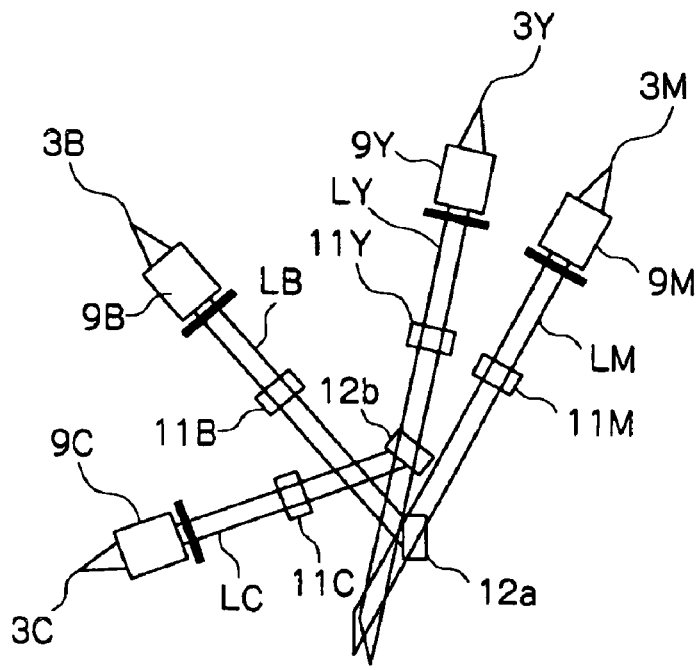
FIG. 6 is a schematic plan view showing a pre-deflection optical system of the optical multi-beam scanning device of a second embodiment.

FIG. 6 is a schematic plan view showing an arrangement of the pre-deflection optical system of the optical multi-beam scanning device according to a second embodiment of the invention, and the same reference symbols are used for the same or corresponding parts.

In the second embodiment, the second combining means 12c in the first embodiment is omitted and only a couple of two first combining means 12a and 12b are provided.

Also in the second embodiment, four laser beams L (Y, M, C and B) after passing through the cylinder lenses 11 (Y, M, C and B) for respective color elements are guided to the same surface of the polygon mirror 5a (not shown in the figure) of the light deflection unit 5 through the combining deflection mirrors 12a and 12b.

Figure 7A:
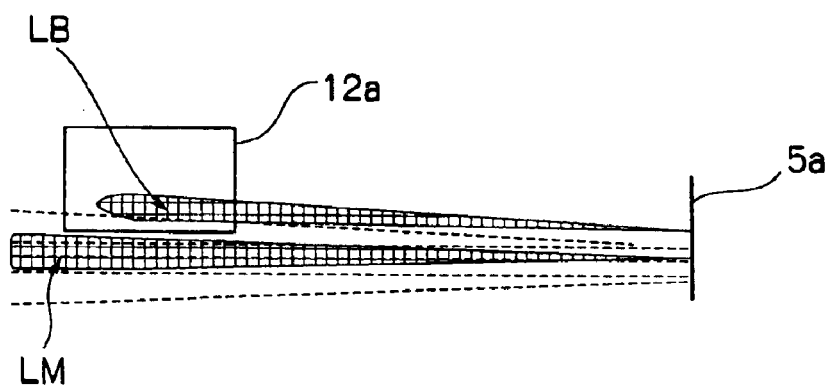
FIGS. 7A and 7B are explanatory views showing the positional relationships in the sub-scanning direction of the laser beams used for combination in the optical multi-beam scanning device of the second embodiment.
Figure 7B:
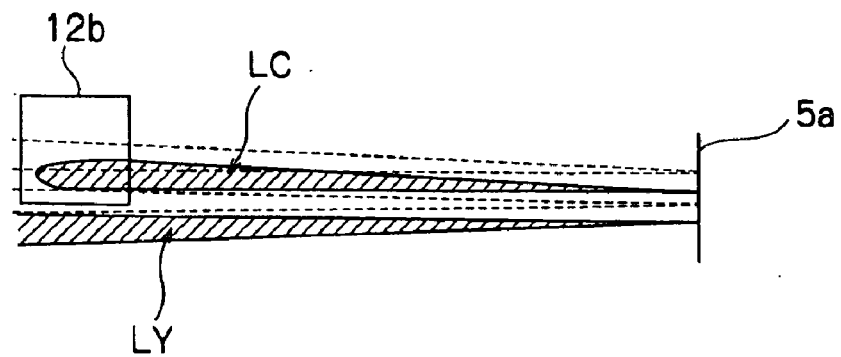

FIG. 7A and 7B are the explanatory views showing the optical paths of the respective laser beams L (Y, M, C and B) following the combining deflection mirrors 12a and 12b, and only the positional relationship in the sub-scanning direction of the respective laser beams L (Y, M, C and B) is precisely shown here.

With respect to the positions in the sub-scanning direction, the respective laser beams L (Y, M, C, and B), which are irradiated on the same surface of the polygon mirror 5a, are different in heights in order of LY, LM, LC, and LB from the lowest position.

The laser beam LY that passed through the yellow cylinder lens 11Y passes, as shown in FIG. 7B, a portion lower than the combining deflection mirror 12b to be guided to the polygon mirror 5a. The laser beam LM that passed through the magenta cylinder lens 11M passes, as shown in FIG. 7A, a portion lower than the combining deflection mirror 12a to be guided to the polygon mirror 5a. The laser beam LC that passed through the cyan cylinder lens 11C are reflected off, as shown in FIG. 7B, the combining deflection mirror 12b to be guided to the polygon mirror 5a. The laser beam LB passed through the black cylinder lens 11B are reflected off, as shown in FIG. 7A, the combining deflection mirror 12a to be guided to the polygon mirror 5a.

Also in the second embodiment, the combining deflection mirror 12a is a combining means for unifying optical path positions in the main-scanning direction of the laser beam LM and LB (Positions in the sub-scanning direction are different.) and the combining deflection mirror 12b is a combining means for unifying the optical path positions in the main-scanning direction of the laser beam LY and LC. (Positions in the sub-scanning direction are different.)

As for the position in the sub-scanning direction on the same surface of the polygon mirror 5a on which laser beams are irradiated, the combining deflection mirror 12b, as well as the combining deflection mirror 12a, combines two laser beams that are at intervals of one laser beam.

Since the second embodiment, which is different from the first embodiment, does not have the second combining means, the incidence angles in the main-scanning direction onto the same surface of the polygon mirror 5a are different between the set of the laser b ams LM and LB and the set of the laser beams LY and LC. Therefore, when considering the sam point of time, irradiation positions in the main-scanning direction on the photosensitive drums 58 (Y, M, C, and B) are different between the set of laser beams LM and LB and the set of laser beams LY and LC.

Despite of the difference in irradiation positions in the main-scanning direction, it is enough to use an electrical processing circuit of the image forming apparatus in order to form color images.

Figure 8:
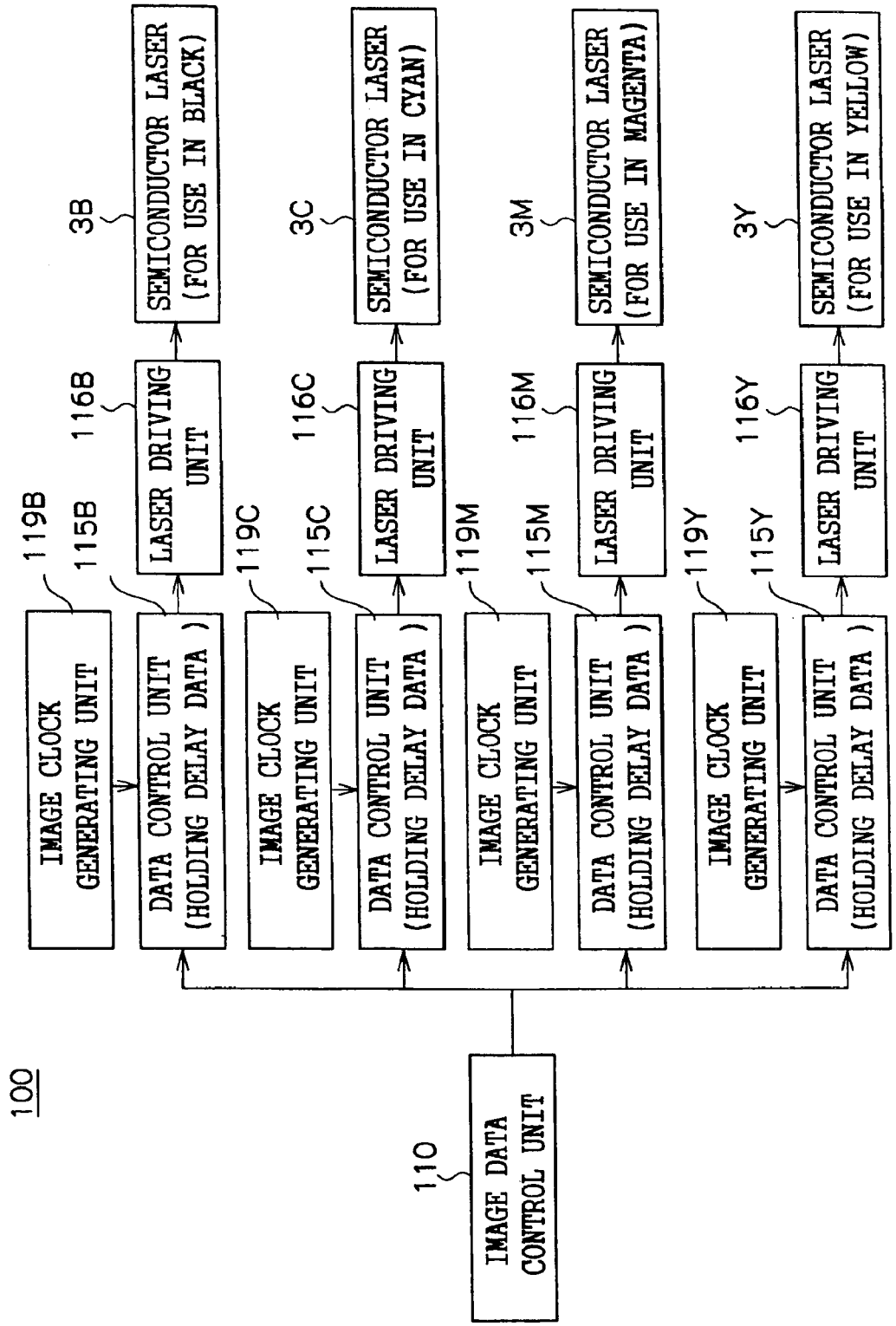
FIG. 8 is a block diagram showing a partial configuration of a processing circuit for controlling image forming operation of the image forming apparatus of the second embodiment.

FIG. 8 is a block diagram showing a partial configuration of the processing circuit for controlling image forming operation of the image forming apparatus 100 and a portion associated with the optical beam scanning device is just shown from the viewpoint of obtaining information necessary for timing control at the time of image forming in the main-scanning direction.

The image forming apparatus 100 includes an image data control unit 110 interconnected with the data control units 115Y, 115M, 115C, and 115B via bus lines, each of which corresponds to each color element.

The image data control unit 110 comprises mainly an image control CPU, a main control CPU. The image data control unit 110 controls operations of mechanical components in the image forming apparatus 100 other than the optical beam scanning device and controls amounts of current flow and voltage values applied to electrical components or the like, while showing thereof using figure is omitted.

Each of the data control units 115 (Y, M, C and B) has therein an image memory, a delay time data holding unit or the like and provides the inputted image data for each corresponding laser driving unit 116 (Y, M, C and B) with timing delayed by a delay time being held and on the basis of an image clock generated by each of the corresponding image clock generating units 119 (Y, M, C, and B).

The respective image clock generating units 119 (Y, M, C, and B) comprise, for example, voltage-controlled oscillator (VCO), where, for example, a frequency of the image clock can be varied within a range of several percent.

The respective laser driving units 116 (Y, M, C, and B) drive semiconductor lasers 3 (Y, M, C, and B) based on the inputted image data.

Here, the delay time held in each of the data control units 115 (Y, M, C and B) is a time which is taken from a moment when, for example, a laser beam for use in black is detected by a horizontal synchronization sensor (not shown) to a moment whin on-off control of the semiconductor lasers 3 (Y, M, C, and B) in response to the image data is started. (In other word, a time taken until latent image writing on the photosensitive drums 58 (Y, M, C, and B) is started.)

In the second embodiment, since the laser beams LY and LC precede in the irradiation positions in the main-scanning direction on the photosensitive drums 58 (Y, M, C, and B) when comparing them with the laser beams LM and LB at the same point of time, the delay tim associated with the laser beams LY and LC are made shorter by values corresponding to the preceding distance than the delay time associated with laser beams LM and LB, whereby positions in the main-scanning direction on the photosensitive drums 58 (Y, M, C, and B) on which the latent images are formed are adjusted.

According to the above-mentioned second embodiment, since the four laser beams irradiated on the same surface of the polygon mirror 5a and having the different positions (or incidence angles)in the sub-scanning direction are separated into two sets of two laser beams that are at intervals of one laser beam when seen from the position in the sub-scanning direction, so that combining of optical paths in the main-scanning direction is performed using combining deflection mirrors 12a and 12b with respect to each set, the effects equivalent to the above-mentioned first embodiment can be provided.

Moreover, further miniaturization of the pre-deflection optical system can be expected with omission of the second combining means. In addition, the optical efficiency in the beam combination unit that exceeds 80% of the regular mirror's reflectance can be ensured.

Note that the half mirror (or the beam splitter) can be employed instead of th combining d flection mirrors as a modification of th second embodiment and two laser beams which are at intervals of one laser beam may be combined in the sub-scanning direction by means of the half mirror (or the beam splitter).

Although the optical paths in the main-scanning direction are, respectively, completely conform to one another between the laser beams LY and LC, and between the laser beams LM and LC in the second embodiment, combination (adjustment) by shifting the optical paths in the main-scanning direction can also be possible, if it is within the range in which the fθ characteristic does not vary widely and the significant degradation of the curvature of field or the curvature of scanning line does not occur.

A Third Embodiment

Figure 9:
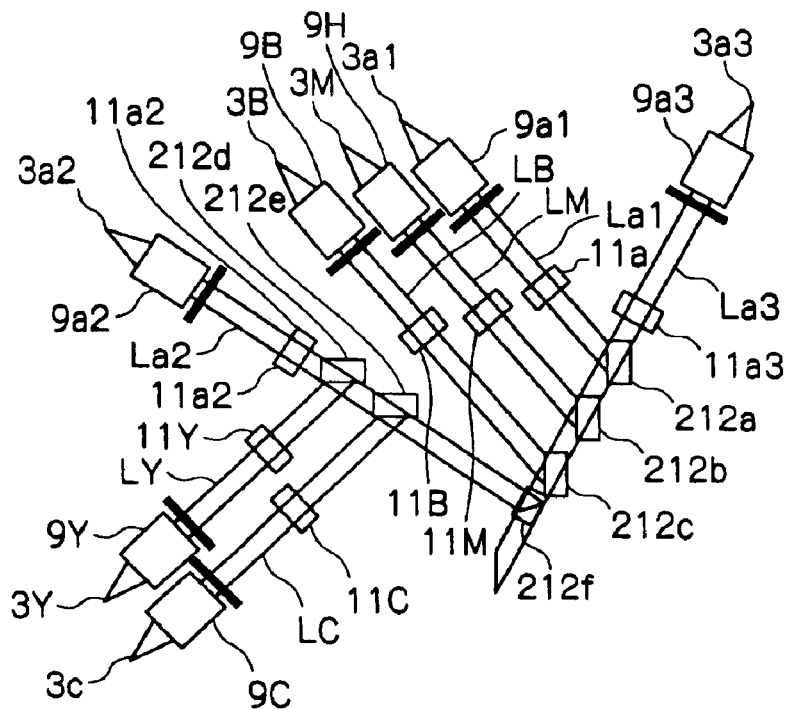
FIG. 9 is a schematic plan view showing the pre-deflection optical system of the optical multi-beam scanning device of a third embodiment.

FIG. 9 is a schematic plan view showing an arrangement of the pre-deflection optical system in the optical multi-beam scanning device according to a third embodiment of the invention, and the same part as the above described second embodiment and the corresponding parts to the second embodiment are shown using the same and corresponding reference symbols.

In the image forming apparatus according to the third embodiment, output images can be formed using at most seven laser beams. Although it is not shown in th figure, seven photosensitive drums are arranged along the traveling dir ction of recording medium (sheets) and theoptical multi-beam scanning device of the third embodiment is adapted to irradiate seven laser beams onto the same surface of the polygon mirror.

Hereinafter, the following configuration is given; each of the seven laser beams LY, LM, LC, LB, La 1, La2 and La 3 is used for yellow, magenta, cyan, black, pale yellow, pale magenta and pale cyan. Note that, R G B (red, green and blue) may be employed for the laser beams La 1 to La3 that are used for colors other than fundamental color elements, therefore, special colors at user's request may also be possible.

With respect to the positions in the sub-scanning direction, seven laser beams LY, LM, LC, LB, La1 to La3 each of which is irradiated on the same surface of the polygon mirror 5a are different in heights of the position in the sub-scanning direction in order of La3, La2, La1, LY, LM, LC, and LB from the lowest beam (See FIG. 10).

Figure 10A:
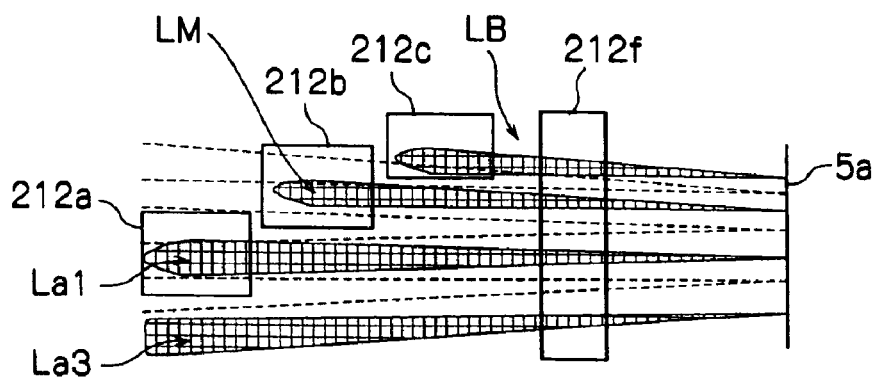
FIGS. 10A and 10B are explanatory views showing the positional relationships in the sub-scanning directi n of the laser beams used for combination in the optical multi-beam scanning d vice of the third embodiment.

The laser beam La3 that passed through the cylinder lens 11a3 for use in pale magenta passes, as shown in FIG. 10A, a portion lower than three combining deflection mirrors 212a to 212c, thereafter, the laser beam La3 further transmits through the half mirror 212f (or the beam splitter) so as to be guided to the polygon mirror 5a. The laser beam La1 that passed through the cylinder lens 11a1 for use in pale yellow is reflected off, as shown in FIG. 10A, the combining deflection mirrors 212a, thereafter, the laser beam La1 further passes through a portion lower than the combining d flection mirror 212b and 212c so as to transmit through the half mirror 212f, whereby the laser beam La1 is guided to the polygon mirror 5a. The laser beam LM that passed through the cylinder lens 11M for use in magenta is reflected off, as shown in FIG. 10A, the combining deflection mirrors 212b, thereafter, the laser beam LM further passes through a portion lower than the combining deflection mirror 212c so as to transmit through the half mirror 212f, whereby the laser beam LM is guided to the polygon mirror 5a. The laser beam LB that passed through the cylinder lens 11B for use in black is reflected off, as shown in FIG. 10A, the combining deflection mirrors 212c, thereafter, the laser beam LB further transmits through the half mirror 212f so as to be guided to the polygon mirror 5a.

The positional relationship of the four laser beams La3, La1, LM, and LB that transmit through the half mirror 212f constituting the second combining means is at intervals of one laser beam in the sub-scanning direction when seen from the irradiation position onto the surface of the polygon mirror 5a.

Figure 10B:
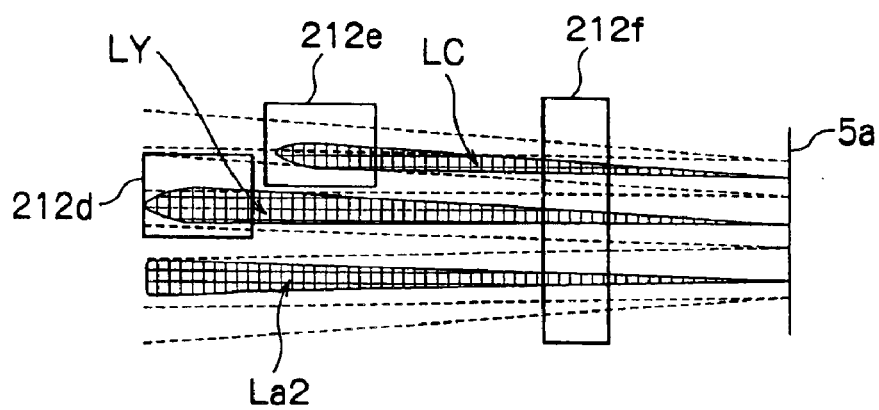

The laser beam La2 that passed through the cylinder lens 11a2 for use in pale cyan passes through, as shown in FIG. 10B, a portion lower than two combining deflection mirrors 212d and 212e, thereafter, the laser beam La2 is further reflected off the half mirror 212f so as to be guided to th polygon mirror 5a. The laser beam LY that passed through the cylinder lens 11Y for use in yellow passes through, as shown in FIG. 10B, a portion lower than the combining deflection mirrors 212e, thereafter, the laser beam LY is further reflected off the half mirror 212f so as to be guided to the polygon mirror 5a. The laser beam LC that passed through the cylinder lens 11C for use in cyan is reflected off, as shown in FIG. 10B, the combining deflection mirrors 212e, thereafter, the laser beam LC is further reflected off the half mirror 212f so that the laser beam LC is guided to the polygon mirror 5a.

The positional relationship of the three laser beams La2, LY, and LC reflected off the half mirror 212f which constitutes the second combining means is at intervals of one laser beam in the sub-scanning direction when seen from the irradiation position onto the surface of the polygon mirror 5a.

According to the third embodiment, although the number of laser beams to be irradiated onto the same surface of the polygon mirror is different from the first embodiment, the effects equivalent to the first embodiment can be provided.

Alternatively, in the third embodiment, although optical paths in the main-scanning direction conform completely to one another, combination (adjustment) under the condition in which optical paths in the main-scanning direction are shifted may also b possible, if it is within the range in which the f. characteristic does not vary greatly and the significant degradation of th curvature of field or the curvature of scanning line does not occur.

Another Embodiment

In the above-described respective embodiments, although the following manners are described in which the plurality of laser beams are separated into two sets, thereafter, combination is performed with respect to each set, so that the laser beams are guided to the same surface of the polygon mirror, the laser beams may also be treated by separating them into three or more sets.

For example, the following manner may also be possible in which seven laser beams LY, LM, LC, LB, La1, La2 and La3 are separated into a set of LY, LB and La3, a set of LM and La1, and a set of LC and La2, each set including the laser beams at intervals of two laser beams. Thereafter, combination of the optical paths in the main-scanning direction is performed within respective sets, and next, the combination of the optical paths between the different set is performed.

Note that, the means in which the combination within the set is performed is referred to as the first combining means while the means in which the combination between the sets is performed is referred to as the second combining means in the above description.

In the above-described respective embodiments, although the following manners are described in which all of the laser beams are guided to the same surface of the polygon mirror, the invention can also be applied optionally to an apparatus in which two surfaces of the polygon mirror are used.

For example, in an apparatus in which four out of the seven laser beams are guided to a certain polygon mirror surface while the other three laser beams are guided to the other polygon mirror surface, the above-described technical ideas of invention may be applicable to the combination in which same irradiation surfaces of the polygon mirror are shared by the four laser beams or the three laser beams.

In the above-described respective embodiments, although the following manners are shown in which laser beams that are not reflected off the combining deflection mirrors pass through the portions lower than the combining deflection mirrors, it goes without saying that the following manner may also be possible in which laser beams pass through portions higher than the combining deflection mirrors.

In the description of the above-described respective embodiments, although the following manner is shown in which the light source (a semiconductor laser) emits one laser beam, such a manner can also be employed in which at least a portion of the light source (a semiconductor laser array) emits two or more laser beams.

In the description of the above-described respective embodiments, although the following manner is shown in which irradiation positions in the sub-scanning direction on the same surface of the polygon mirror differ depending on the laser beams, the present invention can be applied to a configuration in which the irradiation positions are the same. In the above case, it is necessary that the incidence angles in the sub-scanning direction are different. In addition, it may be possible where both the positions and incidence angles are different.

When the present invention is applied, what is the important is that the positions in the sub-scanning direction on the optical paths directed to the same surface of the polygon mirror is different.

What is claimed is:

1. An optical multi-beam scanning device comprising:
three or more light sources;
a pre-deflection optical unit for providing a predetermined characteristic for each of light beams emitted from the light sources and being disposed so that a height of an optical path in a sub-scanning direction differs, each said pre-deflection optical unit corresponding to each of said light sources;
within-set combining means, in order to adjust the optical paths in a main-scanning direction of at least two out of the three or more light beams, for separating the light beams from all of the light sources for which the predetermined characteristics are provided by said pre-deflection optical unit and whose heights of the optical paths in the sub-scanning direction are different into a plurality of sets having light beams components whose positions in the sub-scanning direction in the optical paths are unadjacent, so that the optical paths in the main-scanning direction of the light beams is adjusted with respect to each set including two or more light beams; and a light deflection unit for deflecting all of the light beams which are via the within-set combining means in the main-scanning direction by reflection of a same surface.

2. The optical multi-beam scanning device according to claim 1, wherein the plurality of light beams combined by said within-set combining means and a light beam in a set comprising one light beam are directly emitted onto the same surface of said light deflection unit.

3. The optical multi-beam scanning device according to claim 2, wherein said within-set combining means utilizes optical elements that transmit an incident light beam from a certain direction while reflecting incident light beams from other directions.

4. The optical multi-beam scanning device according to claim 1, wherein there is included a second combining means for adjusting the optical paths in the main-scanning direction of the plurality of light beams combined by said within-set combining means and of the light beam in the set comprising one light beam.

5. The optical multi-beam scanning device according to claim 4, wherein a deflection mirror is utilized for said within-set combining means and said second combining means utilizes optical elements which transmit an incident light beam from a certain direction while reflecting incident light beams from other directions.

6. An optical multi-beam scanning device comprising:
three or more light sources;
a pre-deflection optical unit for providing a predetermined characteristic for each of light beams emitted from the light sources, each said pre-deflection optical unit corresponding to each of said light sources and being disposed so that a height of an optical path in a sub-scanning direction and an angle in the sub-scanning direction differ;
within-set combining means for combining the optical paths by reflecting certain light beams being components of a set, said set being a group of light beams in which respective components are the light beams whose positions in the sub-scanning direction are unadjacent among the light beams which is from each of said pre-deflection optical units and whose heights of the optical paths and angles in said sub-scanning direction differ; and
a light deflection unit for deflecting the plurality of light beams which are via said within-set combining means in the main-scanning direction by reflection of a same surface.

7. The optical multi-beam scanning device according to claim 6, wherein there is included said plurality of within-set combining means, said within-set combining means comprising plane mirrors.

8. The optical multi-beam scanning device according to claim 6, wherein there is included said plurality of within-set combining means, and
second combining means for further combining the groups of light beams included in the plurality of sets from the plurality of combining means in the main-scanning direction.

9. The optical multi-beam scanning device according to claim 8, wherein said second combining means is formed with two prisms adhered to one another.

10. An image forming apparatus comprising:
an optical multi-beam scanning device including a plurality of light sources;
a control unit for controlling light emitting timing of said light sources; and
a photoreceptor on which a latent image is formed based on a light beam from said optical multi-beam scanning device;
wherein said optical multi-beam scanning device includes:
three or more light sources;
a pre-deflection optical unit for providing a predetermined characteristic for each of light beams emitted from the light sources and being disposed so that a height of an optical path in a sub-scanning direction differs, each said pre-deflection optical unit corresponding to each of said light sources;
within-set combining means, in order to adjust the optical paths in a main-scanning direction of at least two out of the three or more light beams, for separating the light beams from all of the light sources for which the predetermined characteristics are provided by said pre-deflection optical unit and whose heights of the optical paths in the sub-scanning direction are different into a plurality of sets having light beams components whose positions in the sub-scanning direction in the optical paths are unadjacent, so that the optical paths in the main-scanning direction of the light beams is adjusted with respect to each set including two or more light beams; and a light deflection unit for deflecting all of the light beams which are via the within-set combining means in the main-scanning direction by reflection of a same surface.

11. The image forming apparatus according to claim 10, wherein the plurality of light beams combined by said within-set combining means and the light beam in a set comprising one light beam are directly emitted onto the same surface of said light deflection unit and said control unit alters start timing of on and off of said respective light sources corresponding to image data in accordance with difference of incidence angles in the main-scanning direction onto the same surface of said light deflection unit between the sets.

12. An image forming apparatus comprising:
an optical multi-beam scanning device including a plurality of light sources;
a control unit for controlling light emitting timing of said light sources; and
a photoreceptor on which a latent image is formed based on a light beam from said optical multi-beam scanning device;

wherein said optical multi-beam scanning device includes:

three or more light sources;

a pre-deflection optical unit for providing a predetermined characteristic for each of light beams emitted from the light sources, each said pre-deflection optical unit corresponding to each of said light sources and being disposed so that a height of an optical path in a sub-scanning direction and an angle in the sub-scanning direction differ;

within-set combining means for combining the optical paths by reflecting certain light beams being components of a set, said set being a group of light beams in which respective components are the light beams whose positions in the sub-scanning direction are unadjacent among the light beams which is from each of said pre-deflection optical units and whose heights of the optical paths and angles in said sub-scanning direction differ; and a light deflection unit for deflecting the plurality of light beams which are via said within-set combining means in the main-scanning direction by reflection of a same surface.

13. The image forming apparatus according to claim 10, wherein the plurality of light beams combined by said within-set combining means and the light beam in a set comprising one light beam are directly emitted onto the same surface of said light deflection unit and said control unit alters start timing of on and off of said respective light sources corresponding to image data in accordance with difference of incidence angles in the main-scanning direction onto the same surface of said light deflection unit between the sets.

* * * * *